(12) United States Patent
Donovan et al.

(10) Patent No.: US 7,916,149 B1
(45) Date of Patent: Mar. 29, 2011

(54) BLOCK LINEAR MEMORY ORDERING OF TEXTURE DATA

(75) Inventors: Walter E. Donovan, Saratoga, CA (US); Emmett M. Kilgariff, San Jose, CA (US); Karim M. Abdalla, Menlo Park, CA (US); Joel J. McCormack, Boulder, CO (US)

(73) Assignee: NVIDIA Corporation, Santa Clara, CA (US)

( * ) Notice: Subject to any disclaimer, the term of this patent is extended or adjusted under 35 U.S.C. 154(b) by 957 days.

(21) Appl. No.: 11/029,940

(22) Filed: Jan. 4, 2005

(51) Int. Cl.
*G06T 11/40* (2006.01)

(52) U.S. Cl. ........ 345/552; 345/530; 345/543; 345/544; 345/564; 345/582; 345/587

(58) Field of Classification Search .................. 345/582, 345/587, 530, 552
See application file for complete search history.

(56) References Cited

U.S. PATENT DOCUMENTS

| | | | |
|---|---|---|---|
| 4,791,403 A | 12/1988 | Mitchell et al. | |
| 4,803,477 A | 2/1989 | Miyatake et al. | |
| 5,109,417 A | 4/1992 | Fielder et al. | |
| 5,227,789 A | 7/1993 | Barry et al. | |
| 5,495,542 A | 2/1996 | Shimomura et al. | |
| 5,644,524 A | 7/1997 | Van Aken et al. | |
| 5,736,987 A | 4/1998 | Drucker et al. | |
| 5,793,371 A | 8/1998 | Deering | |
| 5,801,708 A * | 9/1998 | Alcorn et al. | ................. 345/587 |
| 5,801,975 A | 9/1998 | Thayer et al. | |
| 5,831,640 A | 11/1998 | Wang et al. | |
| 5,835,097 A | 11/1998 | Vaswani et al. | |
| 5,841,442 A | 11/1998 | Einkauf et al. | |
| 5,963,744 A | 10/1999 | Slavenburg et al. | |
| 6,052,127 A | 4/2000 | Vaswani et al. | |
| 6,055,000 A | 4/2000 | Okada | |
| 6,078,334 A | 6/2000 | Hanaoka et al. | |
| 6,184,893 B1 | 2/2001 | Devic et al. | |
| 6,433,789 B1 * | 8/2002 | Rosman | ........................ 345/582 |
| 6,501,851 B1 | 12/2002 | Kondo et al. | |
| 6,546,409 B1 | 4/2003 | Wong | |
| 6,580,828 B1 | 6/2003 | Li | |
| 6,876,362 B1 | 4/2005 | Newhall, Jr. et al. | |
| 7,109,999 B1 | 9/2006 | Lindholm et al. | |
| 7,126,604 B1 * | 10/2006 | Purcell et al. | ................. 345/428 |
| 7,224,838 B2 | 5/2007 | Kondo et al. | |
| 2002/0147753 A1 | 10/2002 | Rao et al. | |

(Continued)

OTHER PUBLICATIONS

Mark Adler, Gzappend, Nov. 4 2003, http://svn.ghostscript.com/ghostscript/tags/zlib-1.2.3/examples/gzappend.com.

*Primary Examiner* — Antonio A Caschera

(57) ABSTRACT

A method of organizing memory for storage of texture data, in accordance with one embodiment of the invention, includes accessing a size of a mipmap level of a texture map. A block dimension may be determined based on the size of the mipmap level. A memory space (e.g., computer-readable medium) may be logically divided into a plurality of whole number of blocks of variable dimension. The dimension of the blocks is measured in units of gobs and each gob is of a fixed dimension of bytes. A mipmap level of a texture map may be stored in the memory space. A texel coordinate of said mipmap level may be converted into a byte address of the memory space by determining a gob address of a gob in which the texel coordinate resides and determining a byte address within the particular gob.

17 Claims, 9 Drawing Sheets

U.S. PATENT DOCUMENTS

| | | |
|---|---|---|
| 2003/0023646 A1 | 1/2003 | Lin et al. |
| 2003/0105788 A1 | 6/2003 | Chatterjee |
| 2003/0169265 A1* | 9/2003 | Emberling .................... 345/552 |
| 2003/0206177 A1 | 11/2003 | Hoppe et al. |
| 2003/0223490 A1 | 12/2003 | Kondo et al. |
| 2004/0027358 A1* | 2/2004 | Nakao .......................... 345/587 |
| 2004/0151372 A1 | 8/2004 | Reshetov et al. |
| 2004/0207631 A1 | 10/2004 | Fenney et al. |
| 2005/0110790 A1 | 5/2005 | D'Amora |

* cited by examiner

BLOCK LINEAR MEMORY ORDERING OF TEXTURE DATA

BACKGROUND OF THE INVENTION

Three-dimensional graphics processing is utilized in a number of applications, from electronic games, and movies to computer aided design (CAD). Conventionally, three-dimensional graphics processing includes a multi-step rendering process of transitioning from a database representation of three-dimensional objects to a pseudo realistic two-dimensional projection of the object into a display space. The process generally includes setting up a polygon model (e.g., a plurality of primitives) of objects, applying linear transformation to each primitive, culling back facing primitives, clipping the primitives against a view volume, rasterizing the primitives to a pixel coordinate set, applying textures to the primitives, shading/lighting the individual pixels, and the like.

The textures, utilized in graphics processing, may be stored as mipmaps in memory. Referring to FIG. 1, an exemplary mipmap, in accordance with the conventional art, is shown. As depicted in FIG. 1, a mipmap contains a plurality of miplevels 110-170. The base miplevel 110 contains the highest resolution version of a given texture (e.g., finest resolution). The resolution of the texture successively decreases in each next higher miplevel. Each texel of a given miplevel typically corresponds to the average of the corresponding four texels in the previous miplevel (e.g., next lower miplevel). Thus, each successive miplevel 130 has a resolution that is one-quarter of the previous miplevel 120. The highest miplevel 170 (e.g. coarsest miplevel) typically is a single texel value corresponding to the average of all the texels in the base miplevel 110. The appropriate miplevel to be applied to a primitive is typically determined by a level of detail (LOD). The LOD of the base miplevel is zero, and the highest LOD identifies the coarsest miplevel.

Referring now to FIG. 2, an exemplary primitive and an exemplary texture to be applied to the primitive, in accordance with the conventional art, is shown. As depicted in FIG. 2, the primitive 210 (e.g., triangle) is rasterized thereby generating a plurality of pixels 230. The exemplary texture 220 may be an appropriate miplevel in a mipmap as determined by the level of detail of the primitive. The primitive 210, in view space, is projected onto the texture 220, in plane space. One or more texels 240 in the texture are thereby associated with each corresponding pixel 230.

A grid pattern has been superimposed upon the texture 220 to illustrate how the texture 220 is stored in memory, in accordance with the conventional art. Each square of the grid represents a texel 240. The texels typically occupy one or more bytes of memory. It is appreciated that a page of memory may be defined as a consecutive range of addresses, typically a power of two in size. There is generally a non-zero cost when a memory read or write operation has to switch from one page to another. In an exemplary implementation, assuming each texel is 4 bytes in size, the texture is 1024× 1024 texels in size, the page is 4096 bytes, and the texture starts at the beginning of a page, then each row of the texture may occupy a page.

For purposes of illustration only, the light vertical gradations represent the four-byte boundaries of each texel 240 and the dark horizontal gradations represent the 16 page boundaries. It is appreciated that memory accesses within a row of the texture map do not incur a page-crossing cost, whereas memory accesses that access different rows do incur a page-crossing cost. Accordingly, the exemplary primitive 210 projected onto the exemplary texture 220, illustrates the memory access costs of conventional art texturing methods. As illustrated, ten page boundaries are crossed when applying the exemplary texture to the exemplary primitive.

Referring now to FIGS. 3A, 3B and 3C, exemplary memory layouts (e.g., logical organizations) for storing texture data, in accordance with the conventional art, are shown. As depicted in FIG. 3A, texel data may be stored in a computer-readable medium in a pitch linear format. In pitch linear format, the texels of a mipmap are stored sequentially in memory. More specifically, texels in a given row are stored sequentially and then the texels in the next row are stored sequentially and so on. For example, an exemplary page partition may be equal to 1024 bytes of memory. An exemplary texel may be equal to 4 bytes. Thus, the first 256 texels in sequence are stored in a page of memory. The memory access costs of pitch linear format is proportional to the total number of page boundaries. For example, the following representation of pitch linear organized texel data assumes that each digit represents a single texel, and the digit value represents the page on which the texel resides (e.g., 8 pages):

```
00000000
11111111
22222222
33333333
44444444
55555555
66666666
77777777
```

It is appreciated that. for ease of understanding, only the first 8 columns and rows of the texture are shown. If 15 lines are drawn through this 8×8 texel portion of the texture, the first line is completely horizontal across 8 texels, the second line slopes all the way across 8 texels and down 1 texel, the third line slopes more steeply all the way across 8 texels and down 2 texels, and so on to the final line which extends 8 texels completely vertically. The first line touches texels on a single page: page 0. The second line touches texels on two pages: pages 0 and 1. The eighth through fifteenth lines touch texels on all eight pages. In summary, each of the 15 lines cross 1, 2, 3, 4, 5, 6, 7, 8, 8, 8, 8, 8, 8, 8, 8 pages, respectively. Thus, the page-crossing cost for pitch linear is proportional to 92.

This layout is fine, if the texels are accessed horizontally across each row. However, typical access patterns have 2D (or 3D for 3D textures) spatial locality. Thus, accesses that are closely spaced in time are likely to proceed to nearby texels in any direction, not just horizontally. The orientation of this spatial locality cannot be predetermined, as it depends upon the observer's point of view. Thus, the same texture will have different patterns of spatial locality as the observer moves around. Accordingly, what is desired is a memory organization that works well regardless of the orientation of the spatial locality.

As depicted in FIG. 3B, texel data may be stored in a computer-readable medium in a block linear format. In block linear format, the memory is logically organized into a plurality of blocks, which are a function of a specific page size of the particular implementation. Texels of a mipmap are stored in xyz block ordering. Within each block the texels are stored sequentially in memory. In an exemplary block linear format, a page of memory contains 8 sequential 4-byte texels (e.g., 32 bytes) in 32 sequential rows. The memory access costs (e.g., latency) of block linear format is proportional to the total number of page boundaries. For example, the following representation of block linear organized texel data assumes that each digit represents a single texel, and the digit value is the page upon which the texel resides (e.g., 4 pages):

```
00001111
00001111
00001111
00001111
22223333
22223333
22223333
22223333
```

In this example, the 8×8 texels of interest have been offset from the upper left corner of the texture by 4 texels horizontally and vertically. (Else all 64 texels would lie on page 0.) Now the total number of pages crossed by 15 lines are: 2, 2, 2, 2, 3, 3, 3, 2, 3, 3, 3, 2, 2, 2, 2. Thus, the page-crossing cost for pitch linear is proportional to 36. It is appreciated that the actual block linear mapping is more complicated. However, the fewer page crossings, of the above examples, illustrate that the block linear page organization is better than the pitch linear page organization.

As depicted in FIG. 3C, if the mipmap is not a power of two bytes in size, a portion of the memory space is not utilized. For example, a texture may be 140 texels high and 129 texels wide, wherein each texel consumes 4 bytes. As a result, 14,800 bytes of memory are allocated for storing the texture but are not utilized. Thus, conventional block linear formats suffer from un-utilized memory when the textures are not a power of two.

SUMMARY OF THE INVENTION

Embodiments of the present invention are directed toward a system and method of organizing memory for storage of texture data. In one embodiment, the method of organizing memory includes dividing a memory space (e.g., computer-readable medium) into a plurality of whole number of blocks of variable dimension. The dimension of the blocks is measured in units of gobs and each gob is of a fixed dimension of rows high, bytes wide and planes deep. A mipmap level of a texture map may be stored in the memory space. A texel coordinate of said mipmap level may be converted into a byte address of the memory space by determining a gob address of a gob in which the texel coordinate resides and determining a byte address within the particular gob.

In another embodiment, the method of organizing memory includes accessing a size of a mipmap level of a texture map. A block dimension may automatically be determined on the fly based on the size of the mipmap level. A memory space (e.g., computer-readable medium) may be divided into a plurality of a whole number of blocks of variable dimension. The dimension of the blocks is measured in units of gobs and each gob is of a fixed dimension of bytes. A mipmap level of a texture map may be stored in the memory space.

In another embodiment, a computing device includes a processor communicatively coupled to a computer-readable medium. The processor determines a color and a depth value for each pixel of a display. The computer-readable medium stores texture data utilized for determining the color for each pixel. The computer-readable medium is logically divided into a plurality of a whole number of blocks, wherein each block is divided into a plurality of gobs of the same size. The processor also maps a coordinate of a texel to a byte address in the computer-readable medium by computing a gob offset value.

BRIEF DESCRIPTION OF THE DRAWINGS

Embodiments of the present invention are illustrated by way of example and not by way of limitation, in the figures of the accompanying drawings and in which like reference numerals refer to similar elements and in which.

DETAILED DESCRIPTION OF THE INVENTION

Reference will now be made in detail to the embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present invention, numerous specific details are set forth in order to provide a thorough understanding of the present invention. However, it is understood that the present invention may be practiced without these specific details. In other instances, well-known methods, procedures, components, and circuits have not been described in detail as not to unnecessarily obscure aspects of the present invention.

Embodiments of the present invention provide a method and system for implementing block linear memory ordering of texture data and providing automatic mapping of the paging architecture on the fly based on texture size and mipmap level size. Block linear memory ordering results in improved paging performance during accesses to memory. The embodiments of the present invention and their benefits are further described below.

Figure 1:
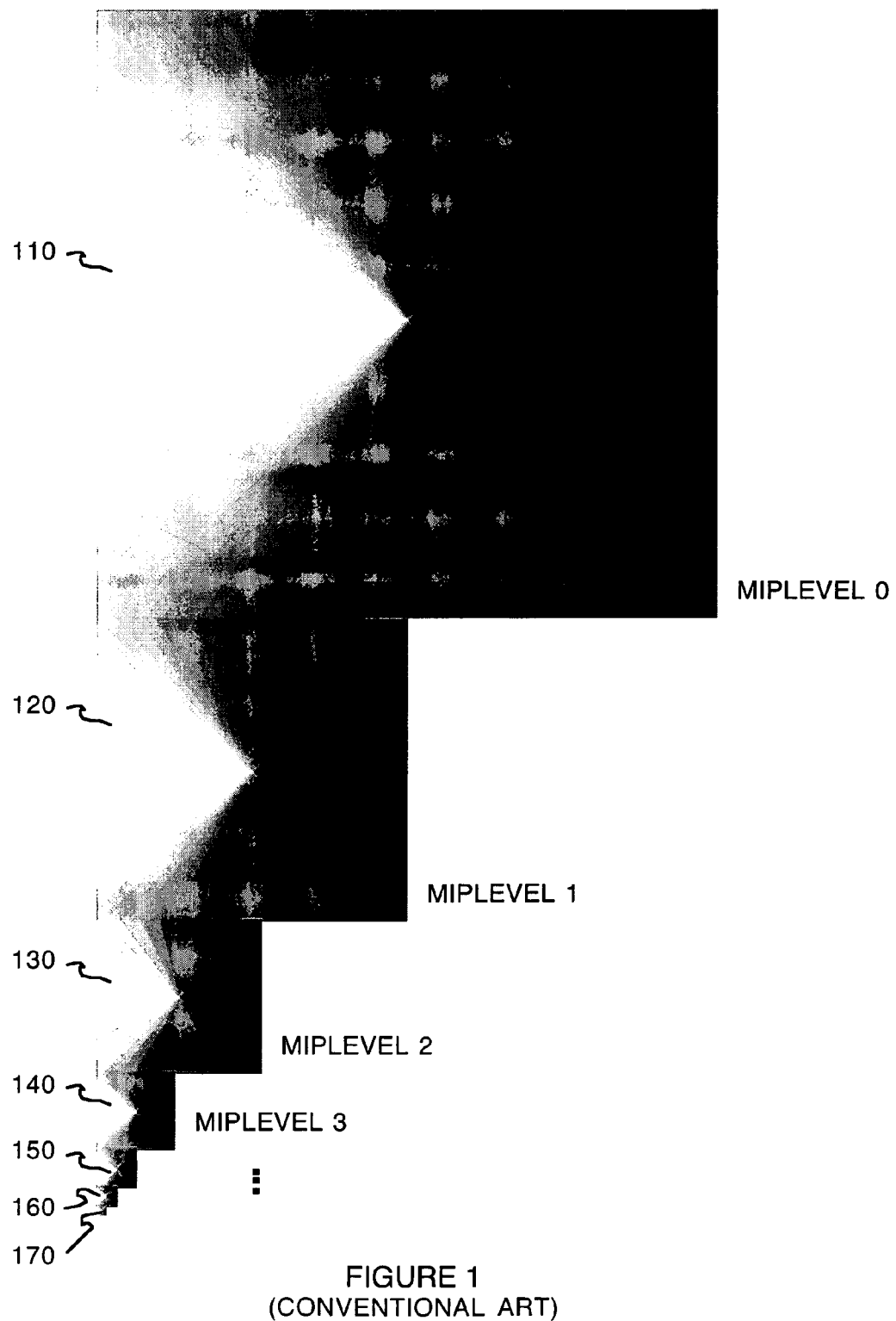
FIG. 1 shows an exemplary mipmap, in accordance with the conventional art.
Figure 2:
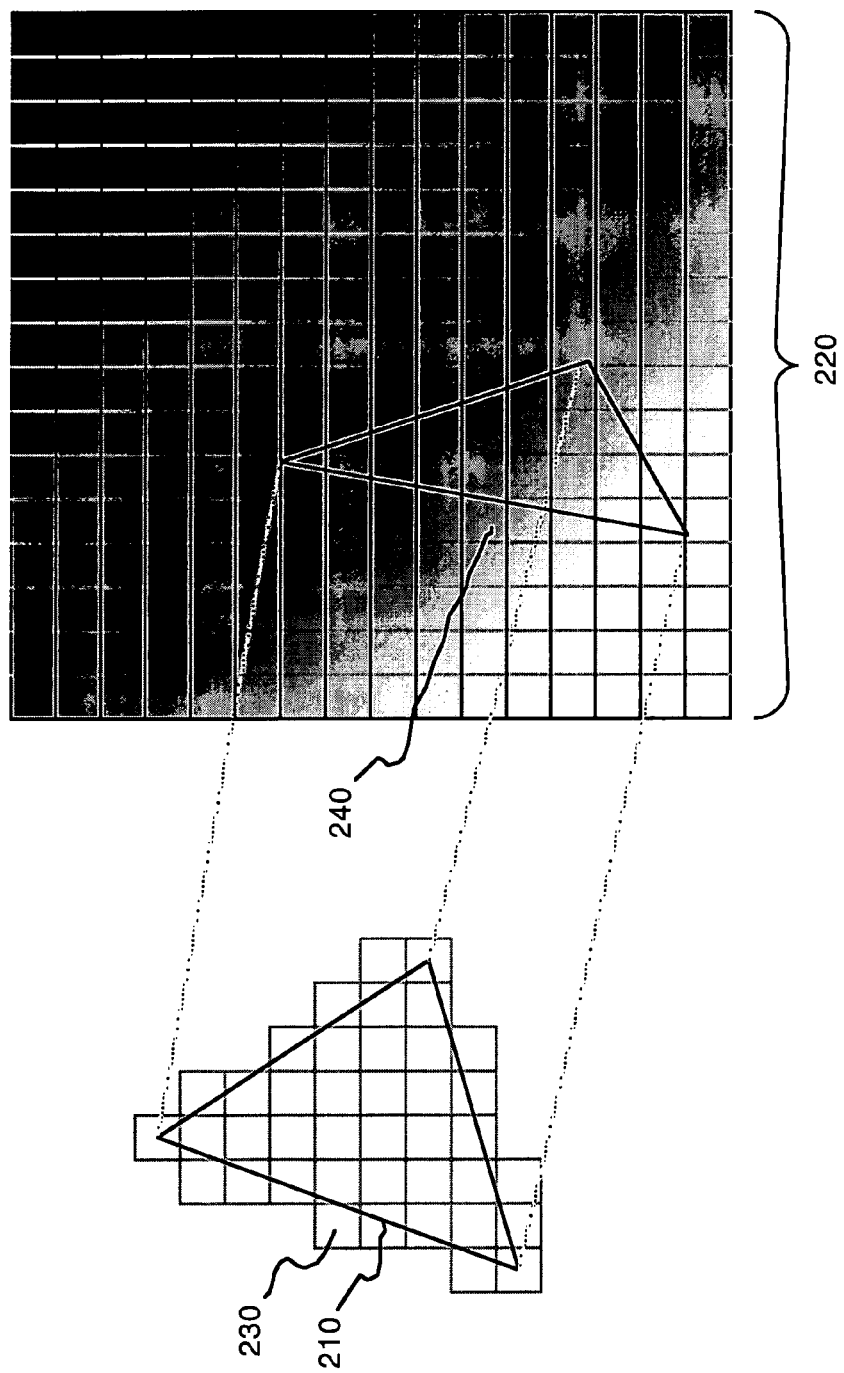
FIG. 2 shows an exemplary primitive and an exemplary texture to be applied to the primitive, in accordance with the conventional art.
Figure 3A:
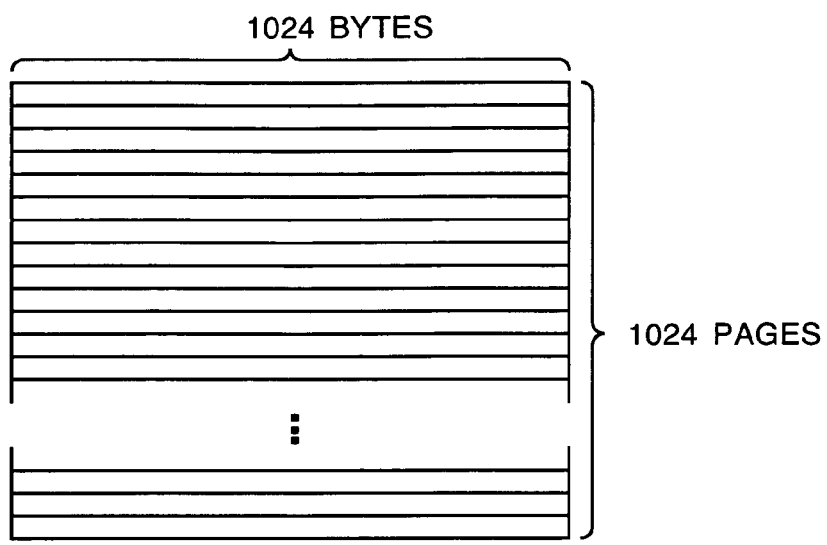
FIGS. 3A, 3B and 3C show exemplary memory layouts for storing texture data, in accordance with the conventional art.
Figure 3B:
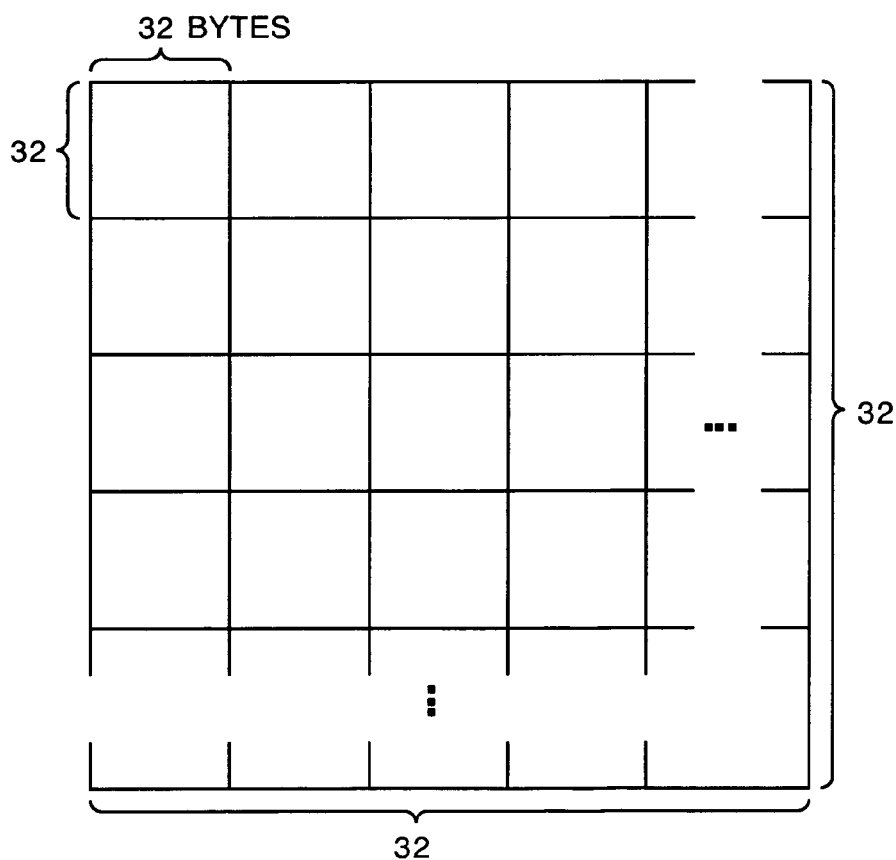
Figure 3C:
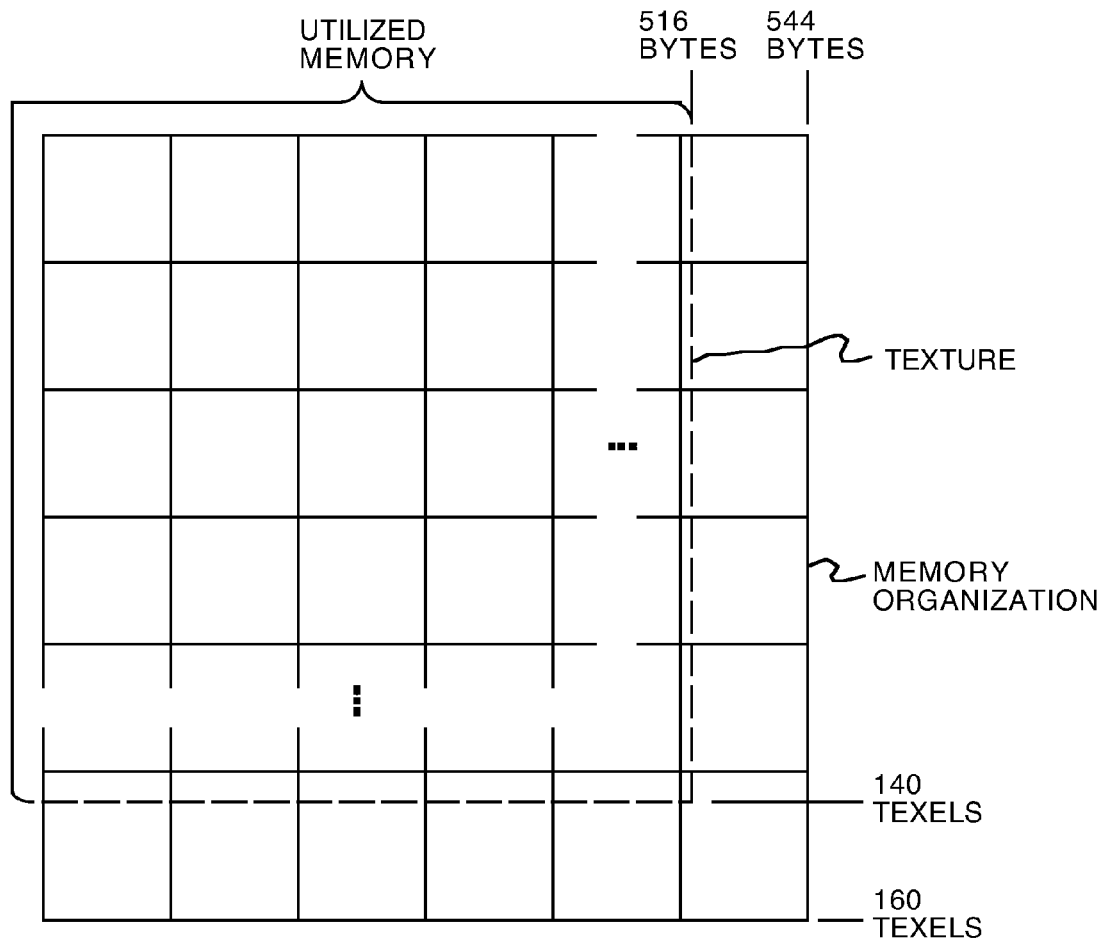
Figure 4A:
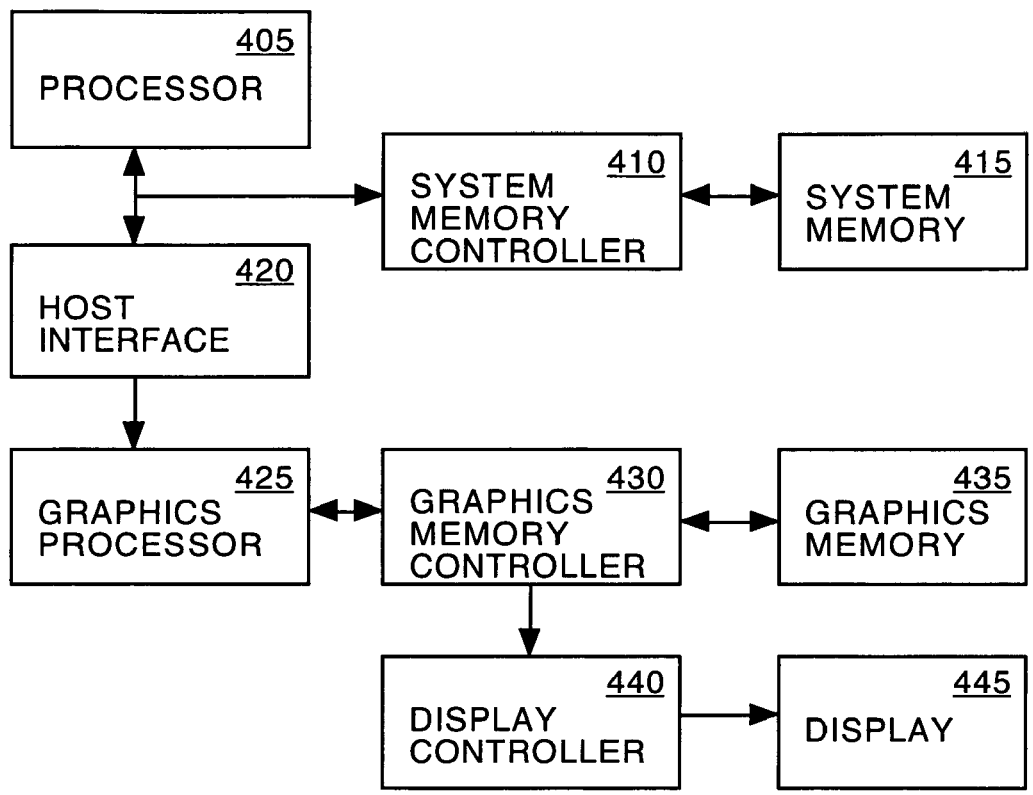
FIGS. 4A and 4B show block diagrams of exemplary computing devices for implementing embodiments of the present invention.
Figure 4B:
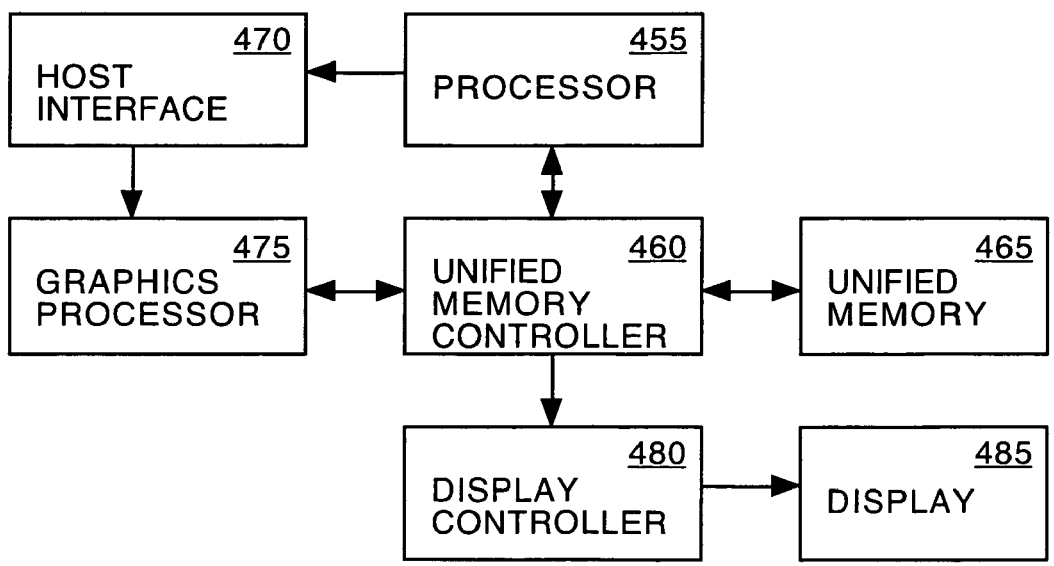

Referring to FIGS. 4A and 4B, block diagrams of exemplary computing device for implementing embodiments of the present invention, are shown. The computing device may be a cellular telephone, PDA or other portable wireless appliance, navigation system (e.g., map enabled GPS), palm-sized computer, tablet computer, game console, personal entertainment center, media center PC, computer based simulator, desktop computer, laptop computer, or the like. The computing device architectures provide the execution platform for implementing certain functionality of embodiment of the present invention. As depicted in FIG. 4A, a first computing device may include a processor 405, a system memory controller 410, a system memory 415, a host interface 420, a graphics processor 425, a graphics memory controller 430, a graphics memory 435, a display controller 440 and a display 445. The processor 405 may be communicatively coupled to the system memory 415 through the system memory controller 410. The processor 405 may also be communicatively coupled to the graphics processor 425 through the host interface 420. The graphics processor 425 may be communicatively coupled to the graphics memory 435 through the graphics memory controller 430. The graphics memory controller 430 may also communicatively couple the display controller 440 to the graphics memory 435. The display 445 may be communicatively coupled to the display controller 440.

As depicted in FIG. 4B, a second computing device may include a processor 455, a host interface 470, a graphics processor 475, a unified memory controller 460, a unified memory 465, a display controller 480 and a display 485. The processor 455 may be communicatively coupled to the unified memory 465 through the unified memory controller 460. The processor 455 may also be communicatively coupled to the graphics processor 475 through the host interface 470. The graphic processor 475 may be communicatively coupled to the unified memory 465 through the unified memory controller 460. The unified memory controller 460 may also communicatively couple the display controller 480 to the unified memory 465. The display 485 may be communicatively coupled to the display controller 480.

The processor 405, 455 provides one or more applications by operating on instructions (e.g., computer executable code) and information (e.g., data) stored in memory 415, 465 (e.g., computer-readable memory). The memory controller 410, 460 controls the flow of such information and instructions between the processor 405, 455 and memory 415, 465. Images to be output on the display 445, 485 may be off-loaded to the graphics processor 425, 475 by the processor 405, 455. The images are off-loaded by transferring geometric primitive parameters, draw commands and instructions for controlling the operation of the graphics processor 425, 475. The primitive parameters, draw commands and instructions are transferred from the processor 405, 455 to the graphics processor 425, 475 under control of the host interface 420, 470. In one implementation, a widely implemented graphics application programming interface, such as the OpenGL-ES™ graphics language, Direct3D™, or the like, is utilized for the software interface between the graphics processor 425, 475 and the applications provided by the processor 405, 455.

The graphics processor 425, 475 generates a color and depth value for each pixel of the display 445, 485 in response to the received primitives, draw commands and instructions. In one implementation, the graphics processor 425, 475 performs geometrical calculations (e.g., transforms) on the primitive in accordance with the draw commands. The graphics processor 425, 475 also performs rasterization wherein values from the geometrical calculations are mapped to corresponding pixels in the display space. The graphics processor 425, 475 also retrieves color, texture and depth information from the memory 435, 465. The memory controller 430, 460 controls the flow of such information between the memory 435, 465 and the graphics processor 425, 475.

The texture data may be stored as mipmaps in the memory 435, 465. In accordance with embodiments of the present invention, the layout in graphics memory of each mipmap is defined by its type, the size of its base level, the number of array elements, the texel type, and the block size. Each miplevel contains a whole number of blocks, and in one implementation may start at a 256 byte alignment for example. A given block size may be more than, equal to or less than a memory management unit page, and in one implementation may start at a 256 byte alignment for example. The blocks of a miplevel may be arranged in an xyz ordering. More specifically, the block ordering in a miplevel may be as many blocks in the x-direction (e.g., wide), then as many block in the y-direction (e.g., high) and then as many blocks in the z-direction. It is appreciated that this ordering is exemplary and that other orderings may be preferred in some embodiments of the invention.

Figure 5A:
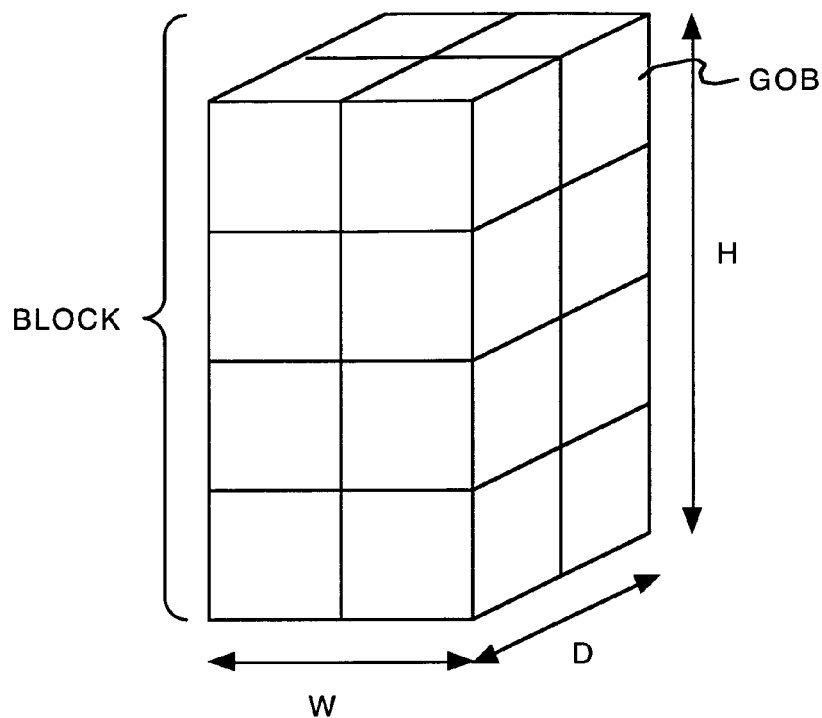
FIGS. 5A and 5B show exemplary memory layouts for storing texture data in memory, in accordance with embodiments of the present invention.
Figure 5B:
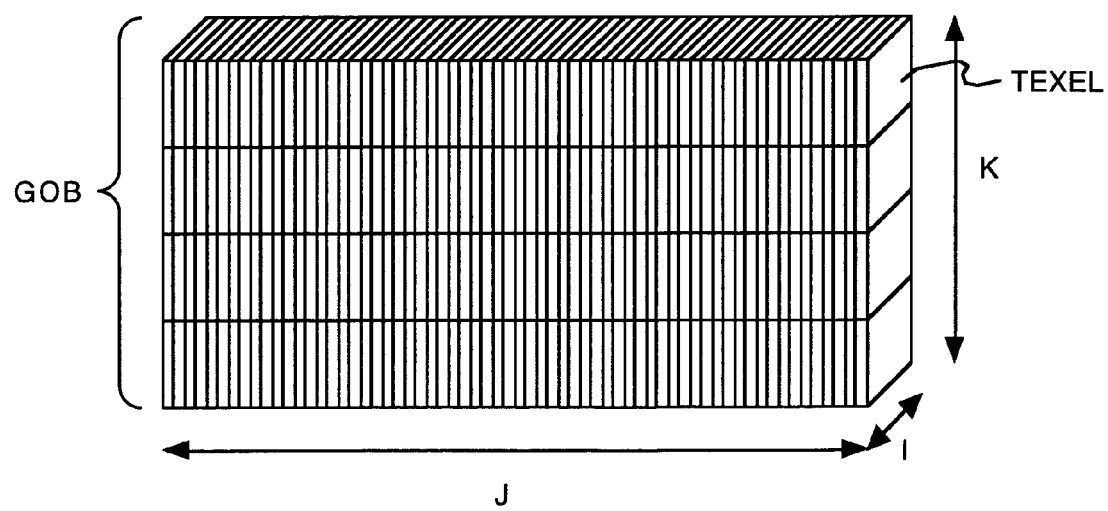

Referring now to FIGS. 5A and 5B, an exemplary memory layout (e.g., logical organization) for storing texture data in memory 435, 465, in accordance with embodiments of the present invention is shown. The memory 435, 465 is logically organized into a plurality of blocks. As depicted in FIG. 5A, each block is W gobs wide, H gobs high and D gobs deep. Accordingly, the block size (e.g., width, height and depth) is specified in units of gobs. The size of a gob for a given mipmap remains a fixed size in one embodiment. The gob ordering in the blocks may also be arranged in an exemplary xyz ordering. As depicted in FIG. 5B, a gob is logically organized into k bytes high, j bytes wide and i bytes deep. In one implementation, a gob may be 4×64×1 bytes. In another implementation, a gob may be 8×8×4 bytes.

A gob provides an additional level of organization of the memory space. A gob provides a fixed unit of memory, which may be organized advantageously in various ways. It is appreciated that embodiments of the present invention are not dependent upon structuring blocks into gobs, as can be seen by using a gob of 1×1×1 bytes, and then simplifying various equations presented below. For example, a gob may be a 1D shape (e.g., rows=planes=1) for 1D textures, and a 3D shape (e.g., rows=2 and planes=2) for 3D textures.

Referring again to FIGS. 4A and 4B, the function of mapping a texel described by x,y,z coordinates into a linear gob and byte address. The linear gob and byte address may be further mapped into an address of the texture in the memory 435, 465, either through mapping functions, page lookups, or both. Thus, block linear may be mapped between the x,y,z address space of the texel and the byte addresses. The byte addresses are represented as an offset from the start address of the texture. The mapping may be configured to dynamically adjust the mapping (e.g., layout) based upon the size of the mipmap, partition size of the memory and the configuration of the memory.

As the miplevels get smaller, the block size is adjusted down. For example, assume that the base block size for the base miplevel (e.g., M=0) is W gobs wide, H gobs high and D gobs deep. Given a gob size of j texels wide, k texels high, and i texels deep, the block size of the base miplevel is jW×kH×iD texels. If the width of a given miplevel (M) (e.g., M=2) is 'mipwidth' (e.g., mipwidth=513), than the block width 'blockwidth' (W') in gobs for the given miplevel M may be determined by computing a first intermediate result that is equal to the integer ceiling of the mipwidth divided by the gob width size j. Finally the blockwidth in gobs is determined by selecting the minimum of the first intermediate result or the base mipwidth in gobs (e.g., $W'=\min(\text{ceil}(\text{mipwidth}_M/j), W)$). If the height of the given miplevel is 'mipheight' (e.g., mipheight=129), than the 'blockheight' (H)' in gobs for the given miplevel may be determined by computing a second intermediate result that is equal to the integer ceiling of the mipheight divided by the gob height size k. Finally the blockheight in gobs is determined by selecting the minimum of the second intermediate result or the base mipheight in gobs (e.g., H'=min(ceil(mipheight/k), H)). (1-dimensional textures are considered to have mipheight=1.) If the depth of the given miplevel is 'mipdepth' (e.g., mipdepth=1), than the "block-depth" (D') in gobs for the given miplevel may be determined by computing a third intermediate result that is equal to the integer ceiling of the mipdepth divided by the gob depth i. Finally the blockdepth in gobs is determined by selecting the minimum of the third intermediate result or the base mipdepth in gobs (e.g., D'=min(ceil(mipdepth/i), D)). (1- and 2-dimensional textures are considered to have mipdepth=1.) The blockwidth (W'), blockheight (H') and blockdepth (D') are each rounded up to the smallest power of two less than or equal to their values.

In embodiments of the present invention, the process of mapping the texture coordinates of a texture data into an address is performed utilizing a function. Given an address of a texture, and the texture coordinates of a specific texel, the graphics processor 425, 475 and/or memory controller 430, 460 computes a gob offset value. The offset value is computed relative to the start of a given mipmap level. More specifically, the x, y and z-coordinates, in gobs, of a given texel may be determined as a function of the x-coordinate of the texel, the y-coordinate of the texel, the z-coordinate of the texel, the gob width in texels, the gob height in texels, and the gob depth in texels. The x, y and z-coordinates, in blocks, of the texel may be determined as a function of the x-coordinate of the texel in gobs, the y-coordinate of the texel in gobs, the z-coordinate of the texel in gobs, the block width in gobs, the block height in gobs and the block depth in gobs. The blocks are rearranged as a function of the x-coordinate of the texel in blocks, the y-coordinate of the texel in blocks, the z-coordinate of the texel in blocks, the width of the image in blocks, the height of the image in blocks, the depth of the image in blocks, the x-coordinate of the texel in gobs, the y-coordinate of the texel in gobs, the z-coordinate of the texel in gobs, the block width in gobs, the block height in gobs and the block depth in gobs. The gobs inside the block are rearranged as a function of the x-coordinate of the texel in gobs, the y-coordinate of the texel in gobs, the z-coordinate of the texel in gobs, the block width in gobs, the block height in gobs, and the block depth in gobs. Thereafter, the gob in the block format which contains the texel may be determined as a function of the x-coordinate of the texel in gobs, the y-coordinate of the texel in gobs, the z-coordinate of the texel in gobs, the block width in gobs, the block height in gobs and the block depth in gobs. The byte address within the gob in which the texel coordinate resides may be determined as a function of the texel coordinate of the mipmap level and the dimension of the gob size in texels.

The color and depth value of each pixel may then be rendered by the graphics processor 425, 475 upon applying such functions as texture mapping, fogging, alpha testing, depth testing for culling occluded pixels, alphablend color combining and the like. The resulting output pixel data (e.g., color and depth value of each of a plurality of pixels) may then be stored by the graphics processor 425, 475 in the memory 435, 465 under control of the memory controller 430, 460. The display controller 440, 480 reads the pixel data from the memory 435, 465, under control of the memory controller 430, 460. The display controller 440, 480 generates scan control signals, from the pixel data, for output to the display 445, 485. An image is project by the display 445, 485 as a function of the scan control signals.

Although embodiments of the present invention have been described above in conjunction with computing devices including a processor and a graphics processor, it is appreciated that embodiments of the present invention may also be implemented on computing devices wherein the processor provides integrated graphics processing.

Figure 6:
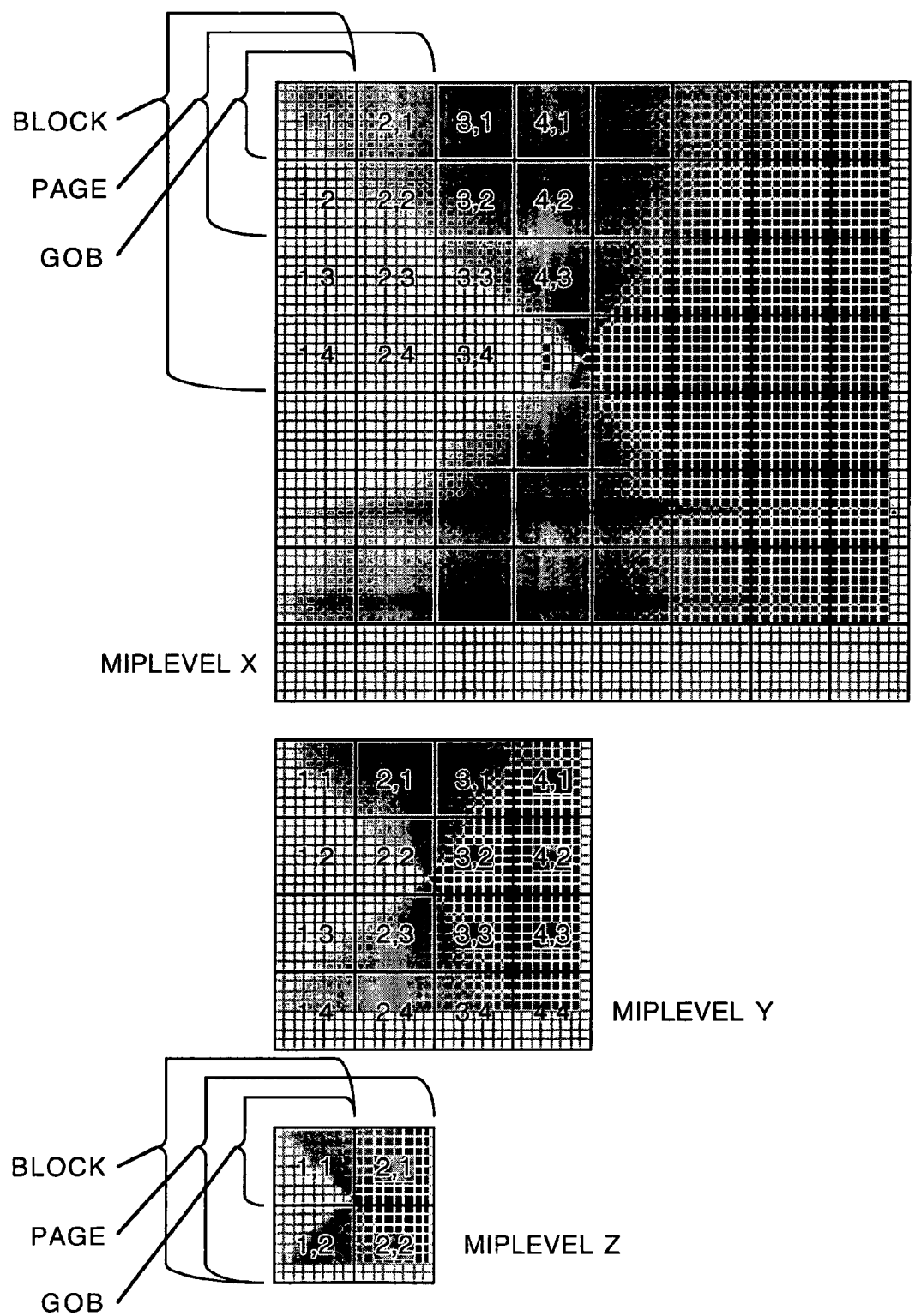
FIG. 6 shows a representation of an exemplary mipmap stored in memory, in accordance with one embodiment of the present invention.

Referring now to FIG. 6, a representation of an exemplary mipmap stored in memory, in accordance with one embodiment of the present invention, is shown. The memory may be dedicated graphics memory 435 or unified memory 465, as described in FIGS. 4A and 4B. As depicted in FIG. 6, the exemplary mipmap comprises a two-dimensional mipmapped texture. However, it is appreciated that embodiments of the present invention may also be utilized in conjunction with one-dimensional, two-dimensional mipmapped texture arrays, two-dimensional mipmapped cube maps, and/or three-dimensional mipmapped textures.

The texture may not be a power of two (e.g., 2N) texels wide and/or high. However, each miplevel of the mipmap contains a whole number of blocks. The size of the block is a parameter of the base miplevel. The block size is specified in units of gobs (e.g., width, height and depth). The gob width, gob height and gob depth are always a power of two (e.g., 64 bytes, 256 bytes, 1024 bytes, etc.). A block can cross a virtual or physical page boundary. The blocks in a miplevel may be arranged, for example, in an xyz ordering. More specifically, as many blocks in the X direction, then in the Y direction and finally in the Z direction.

Each block contains a whole number of gobs. A gob is 256 bytes in one implementation and may be some number of texels wide, high, and deep. The width, height, and depth are each a power of two. A gob does not generally cross a memory management unit page boundary. A gob may contain either uncompressed or compressed data. The gobs in a block may also be arranged, for example, in an xyz ordering. More specifically, as many gobs in the X direction, then in the Y direction and finally in the Z direction. As depicted in miplevel X, the block and gob ordering is specified as "(block, gob)" (e.g., (1,1), (1,2), (1,3), (1,4), etc.). It is appreciated that the organization of texel access is two-dimensional or three-dimensional. It is also appreciated that the shape of the block for a miplevel in the texture is rearranged to minimize the number of times page boundaries are crossed.

It is appreciated that blocks provide a structuring mechanism above the gob. Blocks may organize gobs in 2D or 3D texture coordinate space to increase the probability that gobs that are near each other in texture space are also in the same superpage. A superpage is the same page (RAM row address) across all memory partitions. For optimal setting of the block textures parameters for 2D and 3D, the size of the superpage in bytes, which depends upon the page size of the particular RAM attached to the graphics processor, is utilized. However, the nominal block dimensions are not used directly. Instead, the block dimensions are shrunk appropriately to the dimension of a given miplevel. Each miplevel then contains a whole number of shrunken blocks. The dynamic adjustment of the block size enables ready utilization of a set of block size parameters for a specific combination of: texel type, dimensionality (e.g., 1D, 2D, 3D), number of partitions, and RAM page (row) size.

As depicted in FIG. 6, an exemplary block size, for a 4 bytes per texel texture, may be 32 bytes (8 texels) wide and 32 rows high for a two-dimensional miplevel. Assuming a gob is 8×8 texels, the block size in gobs is W=1, H=4 and D=1. Whenever the mipheight is more than 16 texels (e.g., mip level X and Y), the block height in gobs remains at 4. For a mipheight in the range of 9 to 16 texels (e.g., mip level Z), the blockheight in gobs (H) is reduced to 2. For a mipheight of 8 texels or less, the blockheight in gobs is reduced to 1.

For a three-dimensional miplevel, an exemplary block size, for a 4 bytes per texel texture, may be 32 bytes (8 texels) wide, 8 rows high, and 4 planes deep. Assuming a gob is 8×8×1 texels, the block size in gobs is W=1, H=1 and D=4. Whenever the mipdepth is more than 2 texels, the block depth (D) in gobs remains 4. For a mipdepth of 2 texels, the block depth in gobs is 2. For a mipdepth of 1, the block depth in gobs is 1.

Figure 7:
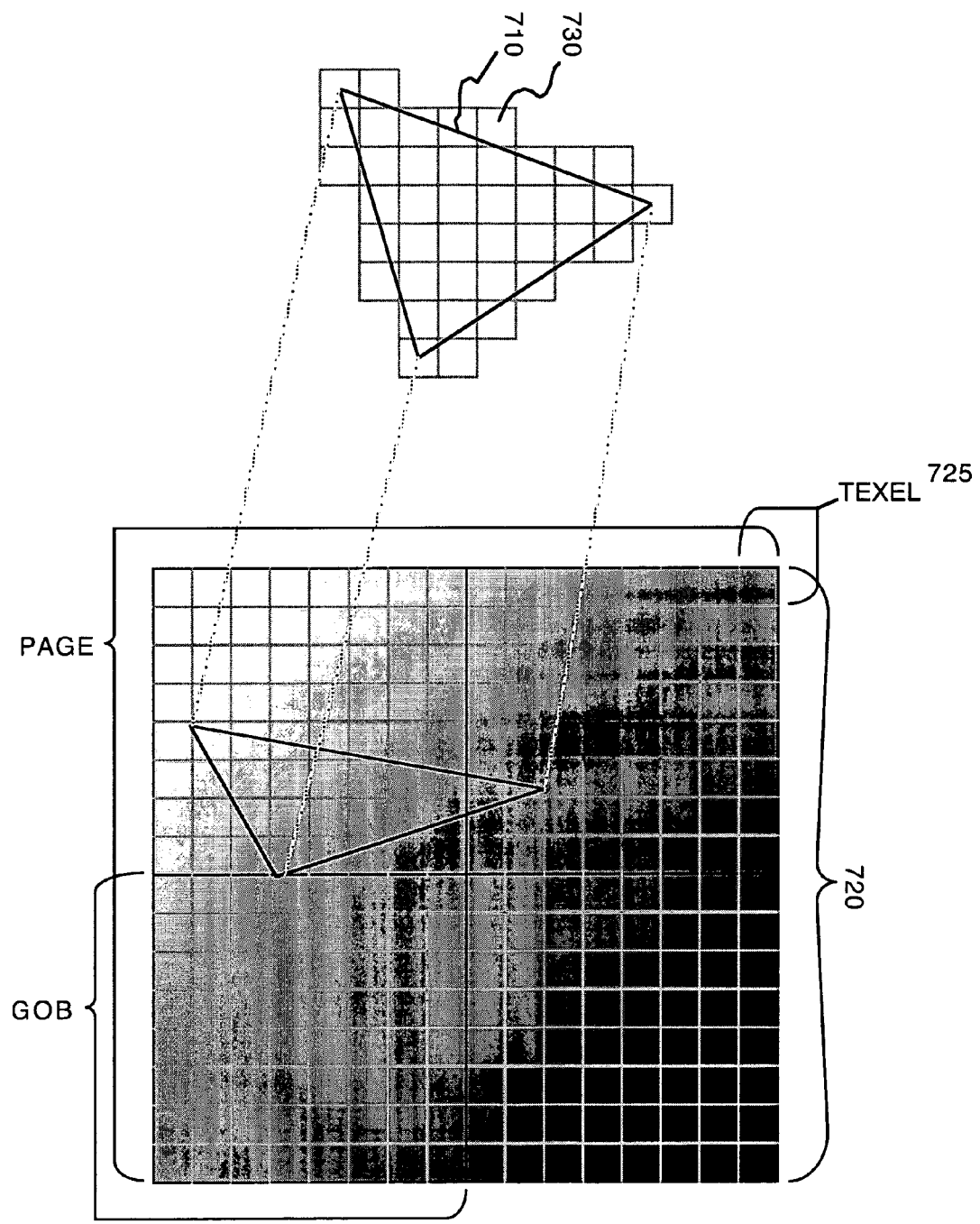
FIG. 7 shows an exemplary primitive and an exemplary texture to be applied to the primitive, in accordance with one embodiment of the present invention.

Referring now to FIG. 7, an exemplary primitive and an exemplary texture to be applied to the primitive, in accordance with one embodiment of the present invention, is shown. As depicted in FIG. 7, the exemplary primitive 710 is rasterized to generate a plurality of pixels 730. The exemplary texture 720 may be an appropriate miplevel of a mipmap as determined by the level of detail of the primitive.

A grid pattern has been superimposed upon the texture 720 to illustrate how the texture is stored in memory, in accordance with one embodiment of the present invention. The memory may be dedicated graphics memory 435 or unified memory 465 as described in FIGS. 4A and 4B. Referring again to FIG. 7, each square of the grid represents a texel 725. The texels 725 typically occupy a plurality of bits of memory. The light gradations represent the byte boundaries of each texels. A word of memory space contains the bytes of texel data in a localized area. Therefore, the ordering of the texel data 720 is rearranged to minimize the number of times page boundaries are crossed when applying a texture to a primitive 710.

Figure 8:
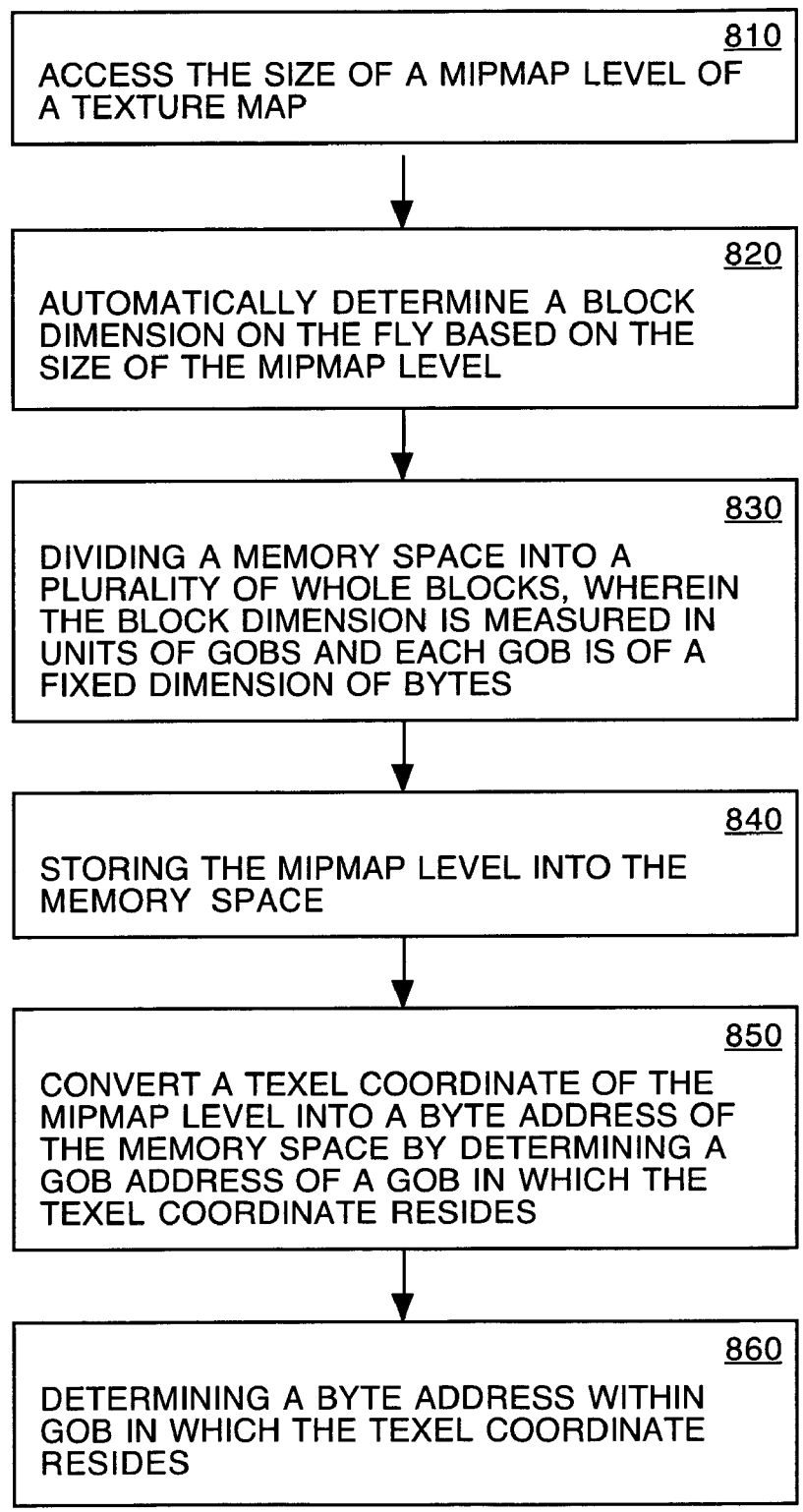
FIG. 8 shows a flow diagram of a computer implemented method of organizing memory, in accordance with one embodiment of the present invention.

Referring now to FIG. 8, a flow diagram of a computer implemented method of organizing memory, in accordance with one embodiment of the present invention, is shown. As depicted in FIG. 8, the method begins with accessing the size of a mipmap level of a texture map, at 810. At 820, a block dimension is determined as a function of the size of the mipmap level. In one implementation, the dimension of the blocks in gobs may be automatically computed on the fly based on the dimension of a given miplevel, a gob dimension in texels and a base block dimension of a base miplevel.

At 830, a memory space may be divided into a plurality of whole blocks. The block dimension is measured in units of gobs and each gob is of a fixed dimension. At 840, the mipmap level may be stored into the memory space.

At 850, a texel coordinate of the mipmap level may be converted into a byte address of the memory space by determining a gob address of a gob in which the texel coordinate reside. In one implementation, a texel coordinate (x,y,z) may be mapped to a byte offset value that is the number of bytes from the texel coordinate (0,0,0) of a given miplevel. First a gob coordinate of the texel may be computed. The x-coordinate of the gob may be calculated by dividing the x-coordinate value of the texel by the gob width in texels. The y-coordinate of the gob may be calculated by dividing the y-coordinate value of the texel by the gob height in texels. The z-coordinate of the gob may calculated by dividing the z-coordinate value of the texel by the gob depth in texels. Since the gob width, height, and depth are all powers of two, the divisions may be replaced by right shifts of the appropriate amounts.

A block coordinate is then determining for the given texel. In one implementation, the x-coordinate of the block may be calculated by dividing the x-coordinate value of the gob by the block width in gobs. The y-coordinate of the block may be calculated by dividing the y-coordinate value of the gob by the block height in gobs. The z-coordinate of the block may be calculated by dividing the z-coordinate value of the gob by the block depth in gobs. Again, since the block width, height, and depth are all powers of two, the divisions may be replaced by right shifts.

In one implementation, the sequential blocks may be sequenced by multiplying the z-coordinate value of the block by the image height in blocks, adding the y-coordinate value of the block to the product, multiplying by the image width in blocks, and then adding the x-coordinate value of the block.

The x-coordinate of the gob in the block may be calculated by taking the block width in gobs and subtracting one, and then Boolean logic AND the result with the x-coordinate value in gobs. The y-coordinate of the gob in the block may be calculated by taking the block height in gobs and subtracting one, and then Boolean logic AND the result with the y-coordinate value in gobs. The z-coordinate of the gob in the block may be calculated by taking the block depth in gobs and subtracting one, and then Boolean logic AND the result with the z-coordinate value in gobs.

The gobs inside the blocks may then be rearranged. In one implementation, the gob sequence value is computed by multiplying the z-coordinate value of the gob in the block by the block width in gobs, adding the y-coordinate value of the gob in the block, multiplying by the block height in gobs, and then adding the x-coordinate value of the gob in the block. Since the block width, height, and depth are powers of two, the multiplications may be replaced by left shifts, and the additions may be replaced by Boolean logic OR operations.

The gob in the block format, which contains the given texel, may be computed. In one implementation, the address of the gob is determined by multiplying the sequential block value by the product of the block width in gobs, the block height in gobs and the block depth in gobs, and then adding the gob sequence value. Again, an implementation can exploit powers of two. The multiplications can be replaced by first computing the sum of the log base 2 of the block width in gobs, the log base 2 of the block height in gobs, and the log base 2 of the block depth in gobs, and then shifting the sequential block value left by this sum. This shifted value can then be Boolean logic ORed with the gob sequence value.

At 860, a texel coordinate of the mipmap level may be converted into a byte address within the gob in which the texel coordinate resides. The byte address within the gob may be calculated as a function of the texel coordinate of the mipmap level and the dimension of the gob size in texels. In one implementation, the modulus of the texel coordinates divided by the gob size in texels gives the texel address within the gob in which the texel coordinate resides. The z coordinate within the gob is multiplied by the product of the height and width of the gob in bytes, the y coordinate within the gob is multiplied by the width of the gob in bytes, the x coordinate within the gob is multiplied by the size of a texel in bytes, and these three intermediate results are summed to create the byte address within the gob. For example, if the gob size is 4 rows high, 8 texels wide, and 2 texels deep, and the texel size is 4 bytes, a texel coordinate of the mipmap level of z=9, y=27, x=39, has a texel address within the gob of z=1, y=3, x=7. The byte address is 1*4*8*4+3*8*4+7*4=128+56+28=212. Again, as gob dimensions are all powers of two, the modulus, multiplication, and addition operations can be reduced to Boolean AND, shift, and Boolean OR operations, respectively.

An exemplary computer-executable code for implementing the method of mapping a texel coordinate to a gob and a byte offset of the gob containing the texel is shown in Table 1. It is appreciated that certain additions may be implemented utilizing the logical OR operations, as noted above. The two sequential multiplications in LINEARMAP below may also be implemented utilizing two parallel multiplications (assuming that another multiplication has already been performed). It is also appreciated that there is a lot of shifting back and forth in the below computations that can be removed. Accordingly latency and real estate are decreased in a hardware implementation.

TABLE 1

```
#define LINEARMAP(x, y, z, width, height) \
    (((z) * (height) + (y)) * (width) + (x))
#define EXP2(x) (1<<(x))
#define MASK(x) (EXP2(x)-1)
int texel_to_gob(int X_texel, int Y_texel, int Z_texel,
        // next 3 are ROM functions of the texel format
        int log2_gob_width_texel,
        int log2_gob_height_texel,
        int log2_gob_depth_texel,
        // next 3 are class parameters for the mip level
        int log2_block_height_gob,
        int log2_block_width_gob,
        int log2_block_depth_gob,
        // next 2 are based on texture state and block size
        int image_height_block,
        int image_width_block)
{
    // compute gob coordinates of texel
    int X_gob = X_texel >> log2_gob_width_texel;
    int Y_gob = Y_texel >> log2_gob_height_texel;
    int Z_gob = Z_texel >> log2_gob_depth_texel;
    // compute block coordinates of texel
    int X_block = X_gob >> log2_block_width_gob;
    int Y_block = Y_gob >> log2_block_height_gob;
    int Z_block = Z_gob >> log2_block_depth_gob;
    // rearrange the blocks, basically
    // need 2 multipliers here, as image_width_block
    // and image_height_block aren't powers of two
    int Sequential_block = LINEARMAP(X_block, Y_block, Z_block, image_width_block, image_height_block);
    int X_in_block_gob = X_gob & MASK(log2_block_width_gob);
    int Y_in_block_gob = Y_gob & MASK(log2_block_height_gob);
    int Z_in_block_gob = Z_gob & MASK(log2_block_depth_gob);
    // and rearrange the gobs inside the blocks
    // no multipliers in this one, shifts only.
    int Sequential_gob = LINEARMAP( X_in_block_gob, Y_in_block_gob, Z_in_block_gob,
EXP2(log2_block_width_gob), EXP2(log2_block_height_gob) );
    // finally, compute which gob in the block format contains the texel
    int Address_gob = Sequential_block << (log2_block_width_gob + log2_block_height_gob +
log2_block_depth_gob) + Sequential_gob;
    return Address_gob;
}
```

Embodiments of the present invention provide a method and system for mapping a virtual address of a texture to a physical address of block linear ordered texture data in memory. Embodiments of the present invention dynamically adjust the block size as a function of the size of the miplevel. The block size may be dynamically adjusted such that the do not exceed the size of a mipmap by too much. Accordingly, the block size is not tied to a fixed page size. The ordering of texture data is rearranged to minimize the number of times page boundaries are crossed. The ordering of the texture data also minimizes unutilized memory for non-power of two mipmapped texture data, and for non-power-of-two memory partitions. Thus, the block linear format, in accordance with embodiments of the present invention, may advantageously enable easy and efficient conversion between the pitch-linear form and the block-linear form.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A computer-readable medium storing a plurality of instructions which when executed cause a computing device to implement a method comprising:
    organizing a memory space into a plurality of whole number of blocks and each block into a whole number of gobs, wherein a dimension of each block is a variable number of said gobs but constant for a given mipmap level, a dimension of each gob is a fixed number of bytes, and a plurality of gobs are a fixed size of a page of said memory space, and wherein each block is arranged in a given order of gobs and each gob is arranged in a given order of bytes;
    storing said mipmap level of a texture map into said organized memory space; and
    converting a texel coordinate of said mipmap level into a byte address of said organized memory space.

2. The computer-readable medium according to claim 1, wherein said variable dimension, of said blocks, is a three dimensional measure.

3. The computer-readable medium according to claim 1, wherein said converting a texel coordinate of said mipmap level into a byte address comprises determining a gob address of a gob in which said texel coordinate resides.

4. The computer-readable medium according to claim 3, wherein said converting said texel coordinate of said mipmap level into said byte address of said organized memory space further comprises determining a byte address within said gob in which said texel coordinate resides.

5. The computer-readable medium according to claim 1, wherein a gob is less than a page in size.

6. The computer-readable medium according to claim 5, wherein a block is more than a page in size.

7. The computer-readable medium according to claim 5, wherein a block is less than a page in size.

8. The computer-readable medium according to claim 1, wherein said fixed dimension of each gob is a three dimensional measure.

9. The computer-readable medium according to claim 1, wherein said variable dimension is based on a size of said given mipmap level.

10. A computer-readable medium storing a plurality of instructions which when executed cause a computing device to implement a method comprising:
   accessing a size of a given mipmap level of a texture mipmap;
   automatically determining a block dimension in gobs on the fly as a function of a dimension of said given mipmap level, a gob dimension in texels and a base block dimension in gobs of a base mipmap level;
   organizing a memory space into a plurality of whole number of blocks of variable dimension, wherein said block dimension is measured in units of gobs arranged in a given order in each block and wherein each gob is of a fixed dimension of bytes and provides a level of organization of said memory space for storing texels in addition to said blocks; and
   storing said given mipmap level into said memory space.

11. The computer-readable medium according to claim 10, further comprising converting a texel coordinate of said given mipmap level into a byte address of said memory space by determining a gob address of a gob in which said texel coordinate resides and determining a byte address within said gob in which said texel coordinate resides.

12. The computer-readable medium according to claim 10, wherein said block dimension is reduced as said given mipmap level of said texture mipmap increases.

13. A computing device comprising:
   a computer-readable medium, for storing texture data, wherein said computer-readable medium is logically divided into a first level of organization of a plurality of whole number of blocks, wherein each block is divided into a second level of organization of a plurality of whole number of gobs of texels of a same size, wherein a dimension in gobs of said plurality of blocks are dynamically adjusted as a function of a dimension of a miplevel of a mipmap, a partition size of said computer-readable medium and a configuration of said computer-readable medium comprising computing a block dimension in gobs for a given miplevel as a function of a dimension of said given miplevel, a gob dimension in texels and a base block dimension in gobs of a base miplevel, and wherein texels are arranged in a given order in each gob and gobs are arranged in a given order in each block; and
   a processor, communicatively coupled to said computer-readable medium, for determining a color utilizing said texture data and a depth value for each pixel of a display and for mapping a coordinate of a texel to a byte address in said computer-readable medium by computing a gob offset value.

14. The computing device of claim 13, wherein said texture data comprises said mipmap.

15. The computing device of claim 14, wherein said plurality of blocks of said mipmap are arranged in an xyz ordering.

16. The computing device of claim 14, wherein said gobs are arranged in an xyz ordering in each block.

17. The computing device of claim 14, wherein texels are arranged in an xyz ordering in each gob.

* * * * *